United States Patent
Benson et al.

(10) Patent No.: US 9,128,880 B2
(45) Date of Patent: Sep. 8, 2015

(54) SYNCHRONIZING AND CONTROLLING SOFTWARE DOWNLOADS, SUCH AS FOR UTILITY METER-READING DATA COLLECTION AND PROCESSING

(71) Applicant: Itron, Inc., Liberty Lake, WA (US)

(72) Inventors: Eric Benson, Spokane, WA (US); David Lill, Spokane, WA (US); James Jespersen, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 14/543,600

(22) Filed: Nov. 17, 2014

(65) Prior Publication Data
US 2015/0067670 A1 Mar. 5, 2015

Related U.S. Application Data

(63) Continuation of application No. 10/570,779, filed as application No. PCT/US03/27738 on Sep. 5, 2003, now abandoned.

(51) Int. Cl.
*G06F 11/14* (2006.01)
*G06F 9/445* (2006.01)
*G06F 15/173* (2006.01)

(52) U.S. Cl.
CPC ............. *G06F 11/1433* (2013.01); *G06F 8/61* (2013.01); *G06F 8/65* (2013.01); *G06F 15/173* (2013.01)

(58) Field of Classification Search
CPC ........... G06F 8/61; G06F 8/65; G06F 15/173; G06F 11/1433
See application file for complete search history.

(56) References Cited

U.S. PATENT DOCUMENTS

| 5,963,650 A | 10/1999 | Simionescu et al. |
| 6,308,061 B1 | 10/2001 | Criss et al. |
| 6,437,692 B1 | 8/2002 | Petite et al. |
| 6,438,749 B1 * | 8/2002 | Chamberlain ................ 717/174 |
| 6,618,709 B1 | 9/2003 | Sneeringer |
| 6,631,247 B1 | 10/2003 | Motoyama et al. |
| 6,976,062 B1 * | 12/2005 | Denby et al. .................. 709/220 |
| 6,993,760 B2 * | 1/2006 | Peev et al. ..................... 717/174 |
| 8,776,018 B2 * | 7/2014 | Karve et al. ................... 717/120 |
| 2002/0039068 A1 | 4/2002 | Holowick |
| 2002/0158774 A1 | 10/2002 | Johnson et al. |
| 2003/0126159 A1 * | 7/2003 | Nwafor ......................... 707/200 |
| 2005/0228798 A1 | 10/2005 | Shepard et al. |
| 2006/0103549 A1 * | 5/2006 | Hunt et al. ............... 340/870.02 |

FOREIGN PATENT DOCUMENTS

WO 0101160 1/2001

* cited by examiner

*Primary Examiner* — Jerry Dennison
(74) *Attorney, Agent, or Firm* — Hanley, Flight & Zimmerman, LLC

(57) ABSTRACT

Method and apparatus to manage software updates of networked data collection devices are disclosed. Example disclosed methods involve in response to receiving a software update, determining if the data collection device is to receive the software update and, if the data collection device is to receive the software update, setting, in memory, a state indicator for the data collection device to an update state. Disclosed methods also include in response to receiving a configuration request from the data collection device when the corresponding state indicator is set to the update state, sending an update command to the data collection device, the update command to include a bill of materials corresponding to the software update and a time for the software update to take effect.

20 Claims, 12 Drawing Sheets

SYNCHRONIZING AND CONTROLLING SOFTWARE DOWNLOADS, SUCH AS FOR UTILITY METER-READING DATA COLLECTION AND PROCESSING

CLAIM TO PRIORITY

This patent is a continuation of U.S. patent application Ser. No. 10/570,779, filed Jan. 26, 2007, which was a nation stage application of International Application Serial No. PCT/US03/27738, filed Sep. 9, 2003, which are incorporated by reference in their entirety herein.

CROSS-REFERENCE TO RELATED APPLICATIONS

This application is related to the following commonly assigned U.S. Patent Applications: U.S. patent application Ser. No. 10/931,945, filed on Sep. 1, 2004, entitled "System and Method for Fast Detection of Specific On-Air Data Rate," U.S. Provisional Patent Application No. 60/500,515, filed Sep. 5, 2003, entitled "System and Method for Mobile Demand Reset," U.S. Provisional Patent Application No. 60/500,504, filed Sep. 5, 2003, entitled "System and Method for Optimizing Contiguous Channel Operation with Cellular Reuse," U.S. Provisional Patent Application No. 60/500,479, filed Sep. 5, 2003, entitled "Synchronous Data Recovery System," U.S. Provisional Patent Application No. 60/500,550, filed Sep. 5, 2003, entitled "Data Communication Protocol in an Automatic Meter Reading System,"and U.S. patent application Ser. No. 10/655,759, filed on Sep. 5, 2003, entitled "Field Data Collection and Processing System, such as for Electric, Gas, and Water Utility Data," which are herein incorporated by reference.

BACKGROUND

Utility users and utility providers typically monitor utility use by collecting data from one or more utility meters at users' premises. In some meter-reading systems, meters equipped with transmitters, such as radio-based transmitter modules, transmit meter-reading data locally to a data collection device ("CCU"). So that the collected data may be processed in a meaningful way, the CCU may periodically upload data to one or more host or "head-end" processors via a communication link, such as a wide-area network (WAN) or the Internet. In this way, information from thousands or even millions of meters and field collection devices can be gathered and processed in one or more centralized locations.

Typically, software applications at both the CCU and the head-end are implemented to manage the CCU's data collection, to the control the transmission of data between the CCU and the head-end, and to facilitate downloading of schedules and other applications to the CCU. Accordingly, software updates at the head-end and/or the CCU may be implemented to ensure that the meter-reading system stays updated or to expand the meter-reading system.

While updating software at the head-end may be a relatively straightforward process, updating software at the CCUs may be more difficult, given that a single system may contain hundreds or even thousands of field collection devices possibly spread over a wide geographic area. Accordingly, in some systems, CCUs are configured to download software from the head-end via a network link. Using this technique, system administrators avoid having to physically access each filed collection device to perform a software update. However, a CCU that is downloading software from the head-end may have to interrupt some or all of its data collection and transmission functionality. Because CCUs typically collect and transmit data on an ongoing or frequent periodic basis, interrupting a CCU's data collection and transmission functionality can be problematic, especially when large software updates can take several hours to download.

In addition, with current download techniques, it is difficult to ensure that all CCUs in the system will complete the download process and be ready for upgraded operation at the same time. This can cause difficulties where synchronization of multiple field collection devices is desirable.

Figure 1:
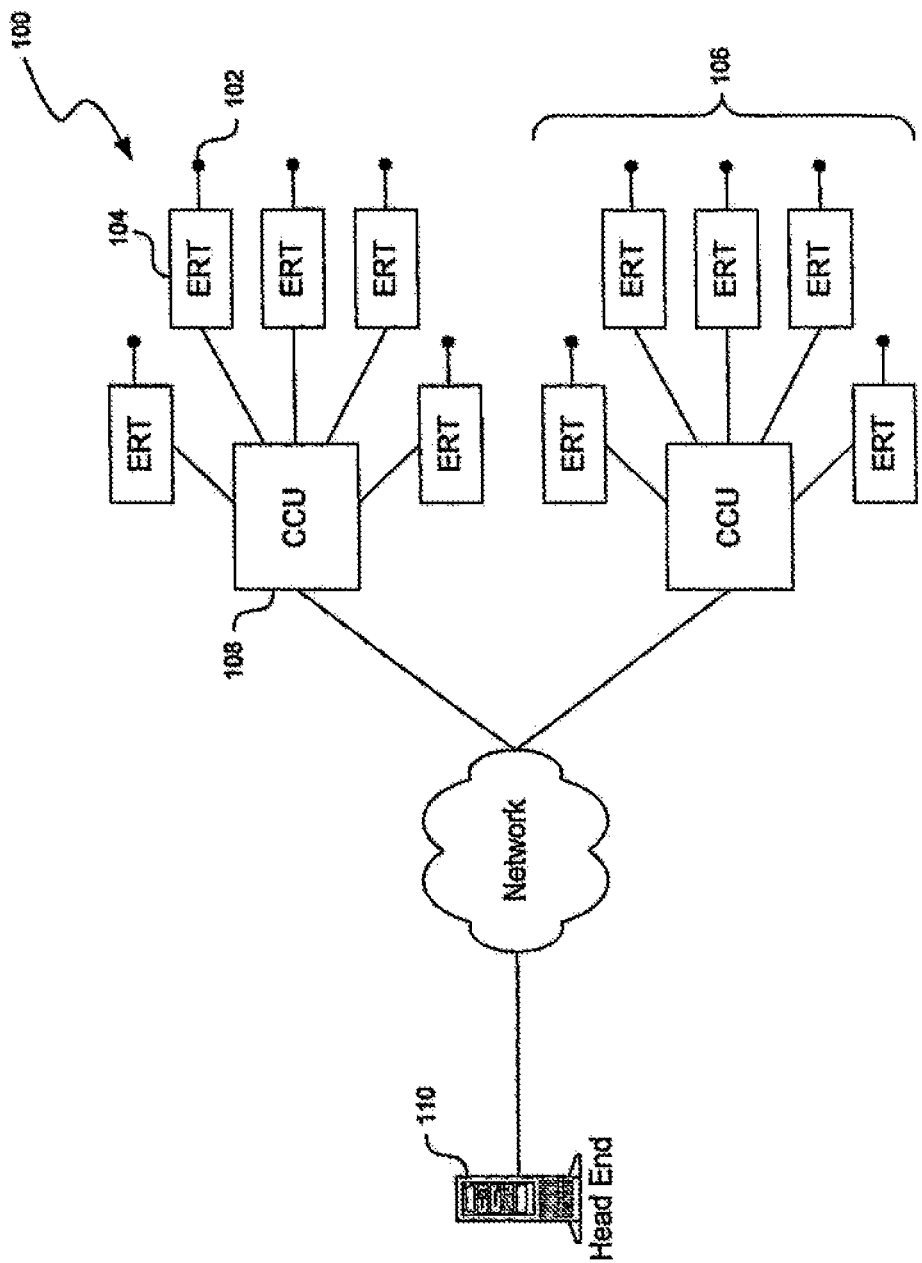
FIG. 1 is a block diagram showing an example of a system on which the software download technique of one embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 1104 is first introduced and discussed with respect to FIG. 11).

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The headings provided herein are for convenience only and do not necessarily affect the scope or meaning of the claimed invention.

It is intended that the terminology used in the description presented below be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

I. Overview

A software download system described in detail below provides a facility for upgrading/reloading distributed embedded data collection devices, such as cell control units ("CCUs"), in the field without having an operator physically visit the CCUs. The software download system may be implemented over a communication network such as the Internet, a wide-area network (WVAN), a local area network (LAN), a cellular network, etc., using well-known protocols and technologies such as HTTP, HTTPS, Wget, Active Server Pages (ASP), etc. The software download system may provide for upgrade and installation of both operating system and application-type components with minimal staging or preparation. The software download system may also facilitate recovery from a "dead box" scenario where a CCU is not working (e.g., due to a corrupted Flash file system) without a service call to the CCU. In addition, the software download system may facilitate efficient use of a system's existing available bandwidth.

A CCU in the software download system may be configured to store more than one version of software. For example, the CCU may store a current version, a previous version, and a next version. During a software download process, the CCU may be in one of a variety of states (e.g., "download pending," "download accepted," "downloaded," "takeeffect pending," "takeeffect accepted," etc.). The state of the CCU may have an effect on how the CCU behaves given a command from the head-end. For example, if a cancel update operation is in progress and the head-end determines that the CCU has already installed the canceled version, it will move the CCU to a "stable" state with the "next" software version being changed to "current" and the old "current" version being changed to "previous."

To facilitate logical grouping of CCU devices, the software download system may also provide grouping and audit capabilities. These capabilities may be used, for example, to monitor versions running at the CCU and the state of any scheduled downloads. The software download system may incorporate techniques to minimize interruption to data transmission functionality of the CCU during the software download process. For example, the software download system may facilitate intelligent sharing of a transport link to minimize interference with a scheduled push of consumption data (e.g., collected meter reading data) to the head-end.

II. System Architecture

FIG. 1 and the following discussion provide a brief, general description of a suitable computing environment in which the invention can be implemented. Although not required, aspects of the invention are described in the general context of computer-executable instructions, such as routines executed by a general purpose computer, e.g., a server computer, wireless device or personal computer. Those skilled in the relevant art will appreciate that the inventor. can be practiced with other communications, data processing or computer system configurations, including: Internet appliances, hand-held devices (including personal digital assistants (PDAs>>, wearable computers, all manner of cellular or mobile phones, multi-processor systems, microprocessor-based or programmable consumer electronics, set-top boxes, network PCs, mini-computers, mainframe computers and the like. Indeed, the terms "computer," "host" and "host computer" are generally used interchangeably, and refer to any of the above devices and systems, as well as any data processor. Aspects of the invention can be embodied in a special purpose computer or data processor that is specifically programmed, configured or constructed to perform one or more of the computer-executable instructions explained in detail herein. Aspects of the invention can also be practiced in distributed computing environments where tasks or modules are performed by remote processing devices, which are linked through a communications network. In a distributed computing environment, program modules may be located in both local and remote memory storage devices.

Aspects of the invention may be stored or distributed on computer-readable media, including magnetically or optically readable computer discs, as microcode on semiconductor memory, nanotechnology memory, or other portable data storage medium. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.} over a period of time, or may be provided on any analog or digital network (packet switched, circuit switched or other scheme). Those skilled in the relevant art will recognize that portions of the invention reside on a server computer, while corresponding portions reside on a client computer such as a mobile device.

Referring to FIG. 1, a suitable system 100 on which the software download techniques may be implemented includes a meter-reading data collection system having multiple meters 102 coupled to utility-consuming devices (not shown), such as electric, gas, or water consuming devices. In the illustrated embodiment, each meter 102 includes an encoder receiver/transmitter module (ERT) 104, which serves as a data collection endpoint. The ERTs 104 encode consumption. Tamper information, and other data from the meters 102 and communicate such information to a CCU 108. The communication of this data may be accomplished via radio-to radio data collection systems such as handheld, mobile automatic meter reading or fixed network. The ERTs 104 can be retrofitted to existing meters or installed on new meters during the manufacturing process. In a system for electrical metering, the ERTs 104 may be installed under the glass of new or existing electric meters 104 and are powered by electricity running to the meter. Gas and water ERTs 104 can be attached to the meter 102 and powered by long-life batteries.

As shown in FIG. 1, a group of ERTs 106 communicates with one of the CCU devices 108, which in turn feeds collected data to a head-end system 110 via periodic uploads. This may occur on an ongoing basis (e.g., every half-hour) or as otherwise needed. The CCUs 108 may be implemented as neighborhood concentrators that read the ERT meter modules 104, process data into a variety of applications, store data temporarily, and transport data to the head-end 110 as needed. In some embodiments, the CCUs 108 can be installed on power poles or street light arms (not shown).

Further details about the system of FIG. 1, and similar systems can be found in the following commonly assigned patent applications: U.S. patent application Ser. No. 09/911, 840, entitled "Spread Spectrum Meter Reading System Utilizing Low-speed/High-power Frequency Hopping," filed Jul. 23, 2001, U.S. patent application Ser. No. 09/960,800, entitled "Radio Communication Network for Collecting Data From Utility Meters," filed Sep. 21, 2001, and U.S. patent application Ser. No. 10/024,977, entitled 'Wide Area Communications Network for Remote Data Generating Stations," filed Dec. 19, 2001, which are herein incorporated by reference.

Figure 2:
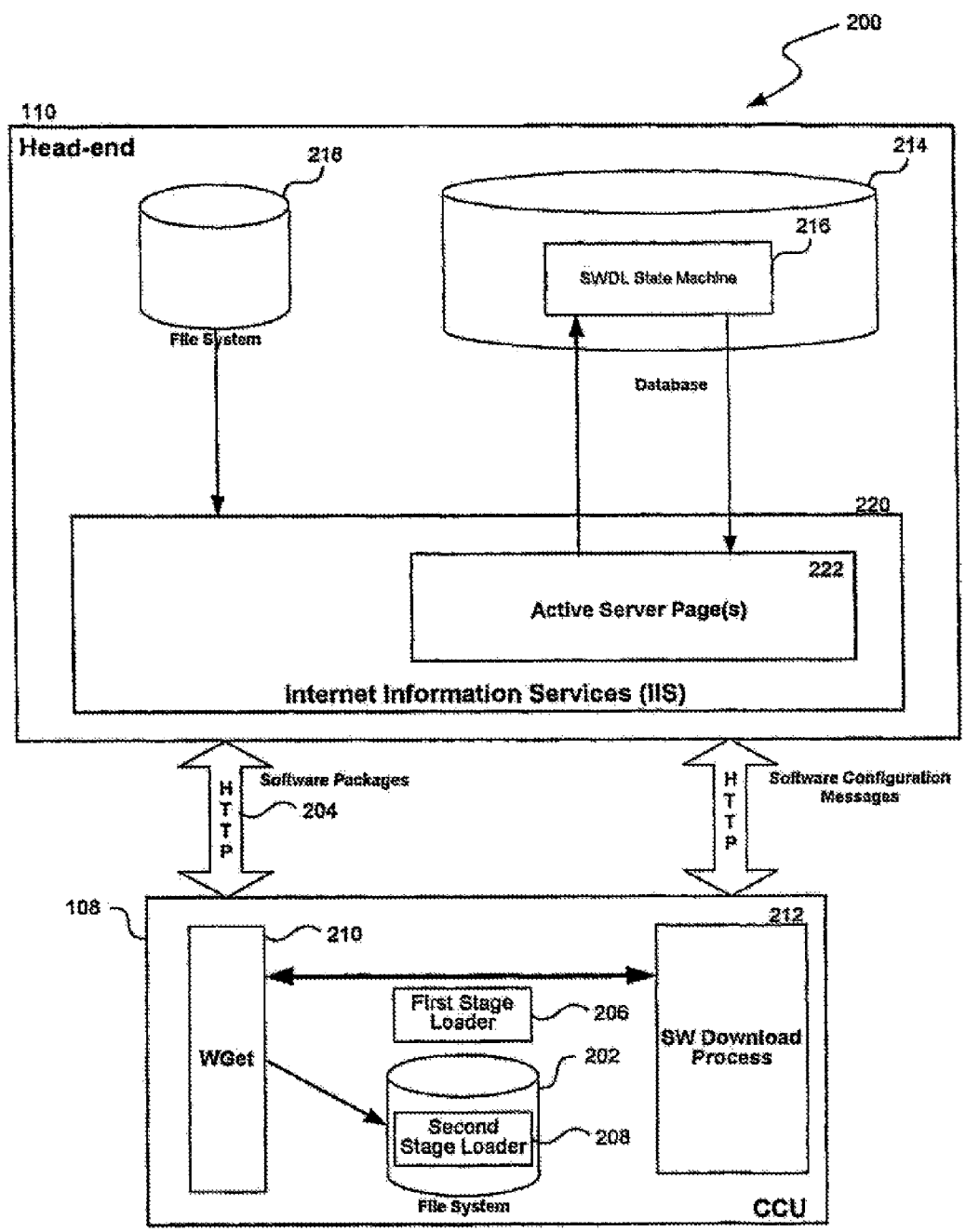
FIG. 2 is a block diagram showing an example of a software download facility operating in the data collection system of FIG. 1.

Referring to FIG. 2, a software download facility 200 operating in the data collection system 100 of FIG. 1 is configured to allow multiple versions of a software package to persist on a CCU 108 at any given time—a\lowing for more robust capabilities of the CCU 108 during download and providing a safety net should a need arise to revert to a previous software version. In the illustrated embodiment, a previous version, a current version and a next version of software can concurrently exist on the CCU 108. However, in alternate embodiments, multiple outstanding versions may be used, while in other embodiments, multiple versions may not be allowed. In systems where multiple software versions are not allowed, if a change needs to be made before an outstanding version of software is installed, the new version can be configured to contain the full set of components needed for the upgrade. In some cases, the CCU 108 checks its current stored outstanding version and only downloads components that it needs. The CCU 108 may also delete any stored software components that are not a part of the newer version.

The software download facility 200 includes components that reside on one or more platforms (not shown) at both the CCU 108 and the head-end 110. The platform at the CCU 108 does not need to be the same as the platform at the head-end 110. For example, the CCU 108 may have a Linux based platform and the head-end 110 may have a Windows 2000 Server platform. Additionally, subcomponents within the system may each operate on independent platforms. The software download facility 200 in the illustrated embodiment provides for updating CCU software stored in a file system 202 at the CCU 108 and for recovering from a catastrophic software failure without requiring a service call to the CCU or a return of the CCU to a repair depot. In some embodiments, it is possible to store a copy of the current package set in a protected partition (not shown) of the CCU file system 202 to facilitate rapid recovery from accidental or malicious corruption of a current software version.

To minimize bandwidth, transport mechanisms of the software download facility, such as those associated with a communication link 204, may support transfer checkpoint/restarts. Application layer protocols such as HTTP, HTTPS. WAP. SMTP, FTP. etc., may be utilized in the transfer of data. In addition, data transferred across the communication link 204 may be compressed using known compression techniques such as Gzip library functions.

Software download-related messages passed between the CCU 10B and the head-end 110 via the communication link 204 may be in request/response format. Such messages are described in more detail in U.S. patent application Ser. No. (Attorney Docket No. 10145-B012.USOO), which has been incorporated by reference. In some embodiments, a request message from the CCU may include outstanding ACKINAK responses from the CCU 10B, while a response message from the head-end 110 may include optional CCU commands ("take effect," "cancel," etc.). The CCU 108 may respond synchronously to the response message by returning another request message with a command response packet appended to it. The appended command response packet may contain a configuration response ACK and an optional command response ACKINAK, depending on whether the command message that the CCU received was from the head-end. This and similar message exchanges can occur during a single session and conversation or in multiple sessions. In some embodiments, the CCU 10B initiates all request/response message exchanges, meaning the head-end 110 does not send any unsolicited messages to the CCU.

Several components of the CCU 10B are associated with the software download facility 200. The CCU 108 may include a two-stage loader (206 and 208) so that it can load software in such a way to help prevent" catastrophic loss of software. In the illustrated embodiment, the first stage loader 206 exists in ROM and is capable of downloading the second stage loader 20B onto the file system 202. The second stage loader 208 may then download operating system features and application software components (not shown) onto the file system 202. During normal operations, the second stage loader 208 of the illustrated embodiment is responsible for ensuring that all the needed software components exist and are not corrupt. In addition, the second stage loader 208 may function to inform the head-end 110 of the current software component versions 'and of the current state of a software upgrade in progress. The second stage loader 208 may also handle downloading new software component versions and installation and rollback of software component versions.

Downloading of software data packages may be handled asynchronously at the CCU 108, in part, by a GNU ("GNU's not Unix") utility known as Wget 210. While Wget is utilized in the illustrated embodiment, other utilities or systems could be used to provide similar functionality, such as FTP, HTTPGet, remote file copy, web server, etc. The CCU software download process 212 can invoke the Wget utility 210 as needed. The Wget utility 210 interacts with downloaded applications stored in the file system 202 of the CCU, so that the CCU 108 can receive and store requested files. The Wget utility 210 may include a transport mechanism for the Wget utility 210 that runs over HTTP (or HTTPS) and, in some embodiments, supports file checkpoint/restart through a "range" feature to aid in recovery in case of a disconnected communication link 204. The Wget utility 210 works by requesting a transfer of data pointed to by a URL. The CCU 108 may be able to build such URLs dynamically based on configuration information and data contained within a message sent by the head-end 110 to the CCU in response to a software download request message. Accordingly, the CCU 108 may be configured so that it knows its own software download server name and an appropriate top level head-end virtual directory, such as an Internet Information Services (IIS) directory.

In addition to processing the messages passed between the head-end 110 and the CCU 108, the CCU software download process 212 may be responsible for providing an interface with the Wget utility 210, which is used for the actual download of software packages as described above. The CCU download process 212 may also be responsible for maintaining download status information until the information has been forwarded to the head-end 110. The CCU download process 212 is also used to verify the correctness of the current version and to re-download missing or corrupt components, save current software versions, verify a new software version prior to installation, and install the new version at a scheduled "take effect" time. The CCU download process 212 may also be responsible for sending shutdown requests to other processes such as a data collection application (not shown) so that those processes can persist data and state information and perform an orderly shutdown. In some embodiments, the CCU software download process 212 may wait for the other processes to end prior to shutting down the CCU 108 completely. The CCU software download process 212 can monitor the shutdown process and generate a hard kill of a process that does not respond to the requested shutdown.

In the illustrated embodiment, the CCU software download process 212 facilitates a "rollback" to a previous version of software stored in the CCU file system 202. The installation of a new version is handled as an autonomous operation so that if a subsequent update or rollback is not successfully completed, the CCU 108 reverts to a state it was in prior to attempting the update/rollback. During the update/rollback, the CCU software download process 212 may avoid message exchanges with the head-end 110 until completion of the operation to insure that any software download configuration information received at the head-end 110 does not contain partial configuration information.

The head-end processor 110, which includes a database 214 for storing persistent information, supports several components of the software download facility 200. For example, the head-end 110 may provide device grouping, version control and tracking functionality for the management of software download processes via a head-end software download command processor, which is implemented as a state machine 216 in some embodiments. In other embodiments, standard hierarchy-based, procedural, or object-oriented coding practices may implement the software download processor instead of the state machine. The state machine 216 can exist in the database 214 and may be implemented using stored procedures and triggers stored in the database 214 at the head-end 110 or may be implemented using components stored on the file system 218 at the head-end 110.

While in the illustrated embodiment, the head-end 110 is not responsible for packaging, building, releasing, and verifying of CCU software packages, in alternative systems (not shown) the head-end 110 may facilitate these tasks. For example, various types of CCU software (application. operating system, etc.) can be packaged into sets or packages using a package manager such as a Linux based Remote Package Manager (RPM), or a proprietary package manager. In some embodiments, each set of packages corresponds to a version of the software and constitutes the bill of materials (BOM) for that version. Accordingly, the BOM contains all the information needed by the CCU 108 to verify the validity of a currently installed version.

The file system 218 at the head-end 110 stores applications (not shown) that may facilitate the transfer of software packages. An Internet Information Service (IIS) component 220 may interact with the file system 218 to download files (e.g., RPM files) from virtual directories via the communication link 204. An Active Server Page (ASP) component 222 in the IIS component 220 may be responsible for processing binary data and storing it in an appropriate "ToProcess" database tables for further processing. In some embodiments implementing ASP technology, when the ASP component 222 receives a binary message from the CCU 108, it can use Gzip to verify that the message has arrived intact. It then unzips the message, parses it, and stores the parsed message in appropriate data tables. The ASP component 222 may then invoke a stored procedure (not shown) that will invoke the state machine 216. The state machine 216 in turn returns a response to the ASP component 222. The ASP component can then Gzip the response and forward it back to the CCU 108. In some cases, the ASP component 222 may hold an HTTPS session (or other type session) open until the CCU 108 acknowledges receipt of the sent response packet.

Because IIS and Wget can provide the appropriate interaction for the transport of packages, implementation at the head-end may not be needed to handle downloading of software packages.

III. State Machine

In some embodiments of the software download system, the state of a CCU (e.g., CCU 108 of FIGS. 1 and 2), as determined by a CCU decision processor or state machine (e.g., state machine 216 of FIG. 2), may be used in controlling the software download process, and other related processes. For example, the state machine 216 may control a download state of any CCU that is in communication with the state machine. In some embodiments, each state handles self-transitions that may occur if the state machine 216 receives configuration requests or duplicate command response events while waiting for the events that cause a state transition. In such cases, the state machine 216 may rebuild the correct response message, return it to the ASP component 222, and remain in the current state.

The state machine 216 may also be responsible for updating the head-end database• 214 with the status of scheduled software downloads from information received from the CCUs 108. The state machine 216 may use information stored in the database to control downloads of new CCU software components to selected CCUs or groups of CCUs.

Figure 3:
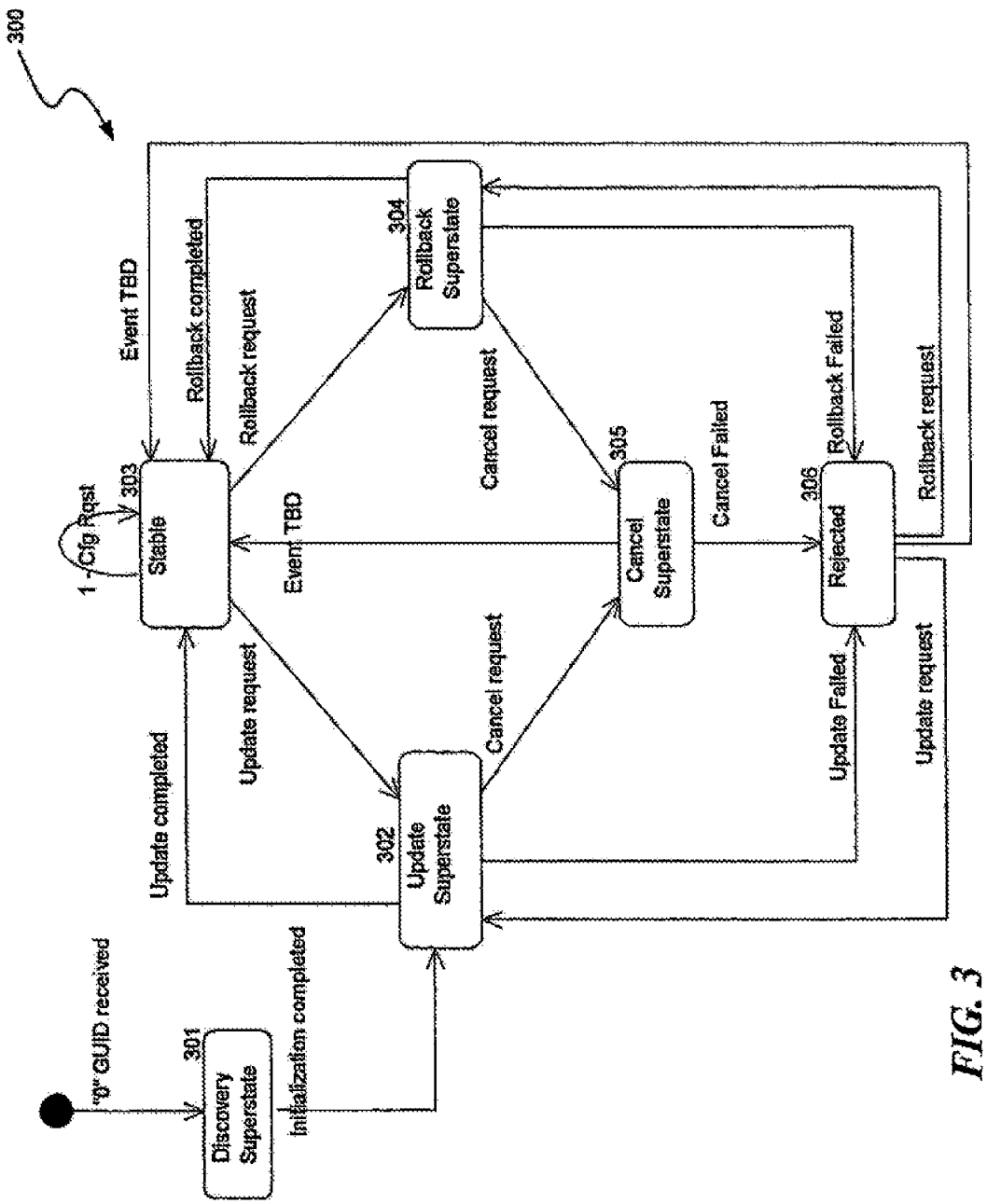
FIG. 3 is a state diagram showing some examples of high-level CCU states, as controlled by the state machine of FIG. 2 in one embodiment.

FIG. 3 is a state diagram 300 showing some examples of high-level CCU superstates ("states"), as controlled by the state machine in one embodiment. These superstates may be associated with various lower level states (as shown in Table 1) that may inherit from, or otherwise relate back to, the superstates. The illustrated states include a discovery state 301, an update state 302, a stable state 303, a rollback state 304, a cancel state 305 and a rejected state 306. Each state can be triggered by some event. For example, in some embodiments, the rejected state 306 can be triggered by a failed software update or software rollback.

The discovery state 301 is invoked for a CCU when the CCU is first incorporated or reincorporated into the system. In some embodiments, the state machine invokes the discovery state 301 for the CCU when the head-end receives a command from a CCU that has a global uniform identifier (GUID) equal to zero or not equal to some default (meaning that the CCU is not known to the system). During the discovery state 301, the CCU may be assigned a default software version (initialization). Once this occurs, the state machine may change the CCU's state to the update state 302 so that a software update can be initiated via processing that occurs at both the head-end and the CCU. From the update state 302, the state of the CCU may proceed to the stable state 303, the cancel state 305 or the rejected state 306. For example, the CCU's state may change from the update state 302 to the stable state 303 if the invoked software update is successfully completed. If, however, the invoked software update fails, then the state may change from the update state 302 to the rejected state 306. In another possibility, if an administrator cancels an invoked software update request, the state may change from the update state 302 to the cancel state 305.

From the stable state 303, the CCU's state may go back to the update state 302 or may proceed to the rollback state 304. The state changes from the stable state 303 to the rollback state 304 if a rollback request is implemented. From the rollback state 304, the state can change back to the stable state 303 if the rollback is successfully completed. If the rollback fails, the state can change to the rejected state 306. If an administrator cancels a rollback, the state may change back to the cancel 305 state.

From the rejected state 306, the state can change to the update state 302, the rollback state 304 or the stable state 303, depending on the nature of the rejection. For example, in the case of a failed software update, the update state 302 may be resumed so that the software update can be reattempted.

Some more detailed examples of CCU states, including those discussed with respect to FIG. 3, are shown in Table 1 below. Table 1 includes a reference to "Process to Execute." Such processes may stored procedures that reside in the database 214 as described with respect to FIG. 2, or could be other programs.

TABLE 1

Sample States

| Current State | Control Input | ProcessTo Execute | Next State |
|---|---|---|---|
| Initialize | Configuration Request Received | NoOp | Download In Transit |
| Initialize | Initialization Failed for Collector | InitializeFailed | Rejected |
| Stable | Configuration Request Received | NoOp | Stable |
| Stable | Update Request | NoOp | Download Pending |
| Stable | Rollback Request | NoOp | RB Pending |
| Download Pending | Configuration Request Received | NoOp | Download In Transit |
| Download Pending | Configuration Request Received and Invalid Take Effect Time | InvalidTakeEffectTime | Rejected |
| Download Pending | Configuration Request Received and No Next Version | InvalidNextVersion | Rejected |
| Download Pending | Cancel Request | NoOp | Stable |
| Download In Transit | Null Control Input | NoOp | Download In Transit |
| Download In Transit | Command Rejected | DownloadInTransitCmdRejected | Rejected |
| Download In Transit | Command Accepted and No Next Version | DownloadAcceptedNoNextVersion | Rejected |
| Download In Transit | Command Accepted and Invalid Take Effect Time | InvalidTakeEffectTime | Rejected |
| Download In Transit | Command Accepted | NoOp | Download Accepted |
| Download Accepted | Null Control Input | NoOp | Download Accepted |
| Download Accepted | Command Complete and No Next Version | DownloadCompleteNoNextVersion | Rejected |
| Download Accepted | Command Complete and Valid TE Time | SetDownloaded | Take Effect In Transit |
| Download Accepted | Command Complete and InValid TE Time | DownloadCompleteInvalidTakeEffectTime | Rejected |
| Download Accepted | Command Completed | SetDownloaded | Downloaded |
| Download Accepted | Command Failed | DownloadAcceptedCmdFailed | Rejected |
| Download Accepted | Cancel Request | NoOp | Cancel Pending |
| Downloaded | Configuration Request Received | NoOp | Downloaded |
| Downloaded | Take-Effect Request | spSoftwareDownloadEvtNoOp | Take Effect Pending |
| Downloaded | Take-Effect Time Request and no Next Version in Database | spSoftwareDownloadEvtInvalidNextVersion | Rejected |
| Downloaded | Cancel Request | NoOp | Cancel Pending |
| Take Effect Pending | Configuration Request Received | NoOp | Take Effect In Transit |
| Take Effect Pending | Configuration Request Received and No Next Version | InvalidNextVersion | Rejected |
| Take Effect Pending | Cancel Request | NoOp | Cancel Pending |
| Take Effect In Transit | Null Control Input | NoOp | Take Effect In Transit |
| Take Effect In Transit | Command Accepted and No Next Version | TakeEffectAcceptedNoNextVersion | Rejected |
| Take Effect In Transit | Command Accepted | NoOp | Take Effect Accepted |
| Take Effect In Transit | Command Rejected | TakeEffectInTransitCmdRejected | Rejected |

TABLE 1-continued

Sample States

| Current State | Control Input | Process To Execute | Next State |
|---|---|---|---|
| Take Effect In Transit | Configuration Request Received and UPD Configuration = Expected | ChangeSWVersion | Stable |
| Take Effect Accepted | Null Control Input | NoOp | Take Effect Accepted |
| Take Effect Accepted | Command Completed and No Next Version | TakeEffectCompletedNoNextVersion | Rejected |
| Take Effect Accepted | Command Completed | ChangeSWVersion | Stable |
| Take Effect Accepted | Command Failed | spSoftwareDownloadEvtTakeEffectAcceptedCmdFailed | Rejected |
| Take Effect Accepted | Configuration Request Received and UPD Configuration = Expected | ChangeSWVersion | Stable |
| Take Effect Accepted | Cancel Request | NoOp | Cancel Pending |
| Rejected | Configuration Request Received | NoOp | Rejected |
| Rejected | Update Request | NoOp | Download Pending |
| Rejected | Rollback Request | NoOp | Rollback Pending |
| Rollback Pending | Cancel Request | NoOp | Stable |
| Rollback Pending | Configuration Request Received | NoOp | Rollback In Transit |
| Rollback Pending | Configuration Request Received and No Previous Version | CfgRqstNoPreviousVersion | Rejected |
| Rollback In Transit | Null Control Input | NoOp | Rollback In Transit |
| Rollback In Transit | Command Accepted | NoOp | Rollback Accepted |
| Rollback In Transit | Command Rejected | RBInTransitCmdRejected | Rejected |
| Rollback In Transit | Command Accepted and No Previous Version | RBAcceptedNoPreviousVersion | Rejected |
| Rollback In Transit | Configuration Request Received and RB Configuration = Expected | RollbackSWVersion | Stable |
| Rollback Accepted | Null Control Input | NoOp | Rollback Accepted |
| Rollback Accepted | Command Completed | RollbackSWVersion | Stable |
| Rollback Accepted | Command Failed | RollBackAcceptedCmdFailed | Rejected |
| Rollback Accepted | Command Completed and No Previous Version | RollBackCompleteNoPreviousVersion | Rejected |
| Rollback Accepted | Configuration Request Received and RB Configuration = Expected | RollbackSWVersion | Stable |
| Cancel Pending | Null Control Input | NoOp | Cancel Pending |
| Cancel Pending | Configuration Request Received | NoOp | Cancel In Transit |
| Cancel Pending | Configuration Request Received and UPD Configuration = Expected | CancelTakeEffectOccurred | Stable |

TABLE 1-continued

Sample States

| Current State | Control Input | ProcessTo Execute | Next State |
|---|---|---|---|
| Cancel Pending | Configuration Request Received and Invalid TakeEffect Time | CancelPendingInvalidTakeEffectTime | Rejected |
| Cancel Pending | Take-Effect Completed | CancelTakeEffectOccurred | Stable |
| Cancel Pending | Take-Effect Failed | CancelPendingTakeEffectFailed | Rejected |
| Cancel Pending | Configuration Request Received and Valid TE Time | NoOp | Cancel In Transit |
| Cancel In Transit | Null Control Input | NoOp | Cancel In Transit |
| Cancel In Transit | Command Accepted | NoOp | Cancel Accepted |
| Cancel In Transit | Command Rejected | CancelInTransitCmdRejected | Rejected |
| CN In Transit | Configuration Request Received and UPD Configuration = Expected | CancelTakeEffectOccurred | Stable |
| Cancel In Transit | Take-Effect Completed | CancelTakeEffectOccurred | Stable |
| Cancel In Transit | Take-Effect Failed | CancelInTransitTakeEffectFailed | Rejected |
| Cancel Accepted | Null Control Input | NoOp | Cancel Accepted |
| Cancel Accepted | Command Accepted | CancelAcceptedCmdComplete | Stable |
| Cancel Accepted | Command Failed | CancelAcceptedCmdFailed | Rejected |
| Cancel Accepted | Configuration Request Received and UPD Configuration = Expected | CancelTakeEffectOccurred | Stable |
| Cancel Accepted | Take-Effect Completed | CancelTakeEffectOccurred | Stable |
| Cancel Accepted | Take-Effect Failed | CancelAcceptedTakeEffectFailed | Rejected |

IV. Software Control Functionality and Interface

Figure 4:
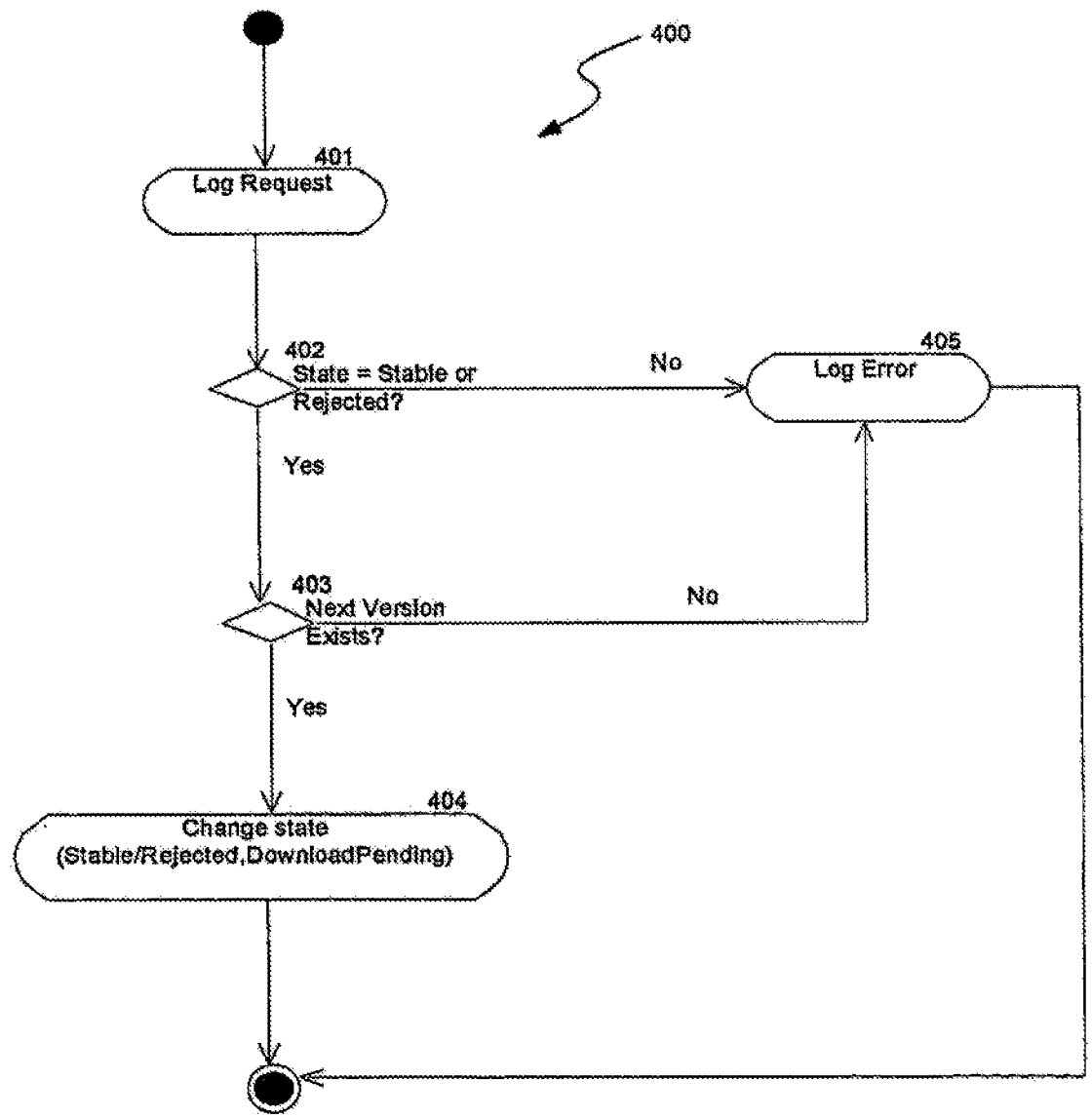
FIG. 4 is an example of a stored procedure or routine that, when executed at the state machine of FIG. 2, places a subject CCU in a download pending state.

The software download facility 200 may provide functionality and corresponding interfaces that allow administrative users to manage the software running on the system's CCUs 108. In some embodiments, this functionality and any corresponding user interfaces may be implemented in part, via stored procedures at the state machine. For example, administrative users may be able to perform operations to set a CCU 108 into a download pending state so that the state machine 216 will send a download command to the CCU the next time the CCU communicates with the head-end. FIG. 4 is an example of a state machine stored procedure or routine 400 that, when executed, places a subject CCU in the download pending state.

The routine begins at block 401 where the routine logs a state change request made by the administrative user. Because moving into the download pending state may not be possible if a CCU is currently in a state other than stable or rejected (e.g., the stable 303 or rejected 306 states of FIG. 3), in decision block 402 the routine checks the current state of the subject CCU. If the subject CCU is not in a stable or rejected state, the routine logs an error at block 405 and then ends. Otherwise, if at decision block 402 the subject CCU is in a stable or rejected state, the routine continues at decision block 403 where the routine checks to see if the administrator's request is valid (e.g., if there is an existing software upgrade available for that particular CCU). If, at decision block 403 the administrator's request is not valid, the routine logs an error at block 405 and then ends. If, however, at decision block 403 the administrator's request is valid, the routine proceeds to block 404, where the state of the subject CCU is updated to the download pending state. The routine then ends.

Once the subject CCU is in a download pending state, the CCU can send a configuration request to the head-end to initiate a software download. The CCU may initiate a configuration request communication. For example, when the CCU reboots or determines that its current software is corrupted or during any scheduled communications window in which a software download bit is set for the window. Some of the processes associated with software downloads are illustrated in more detail in FIGS. 5 through 11.

Figure 5:
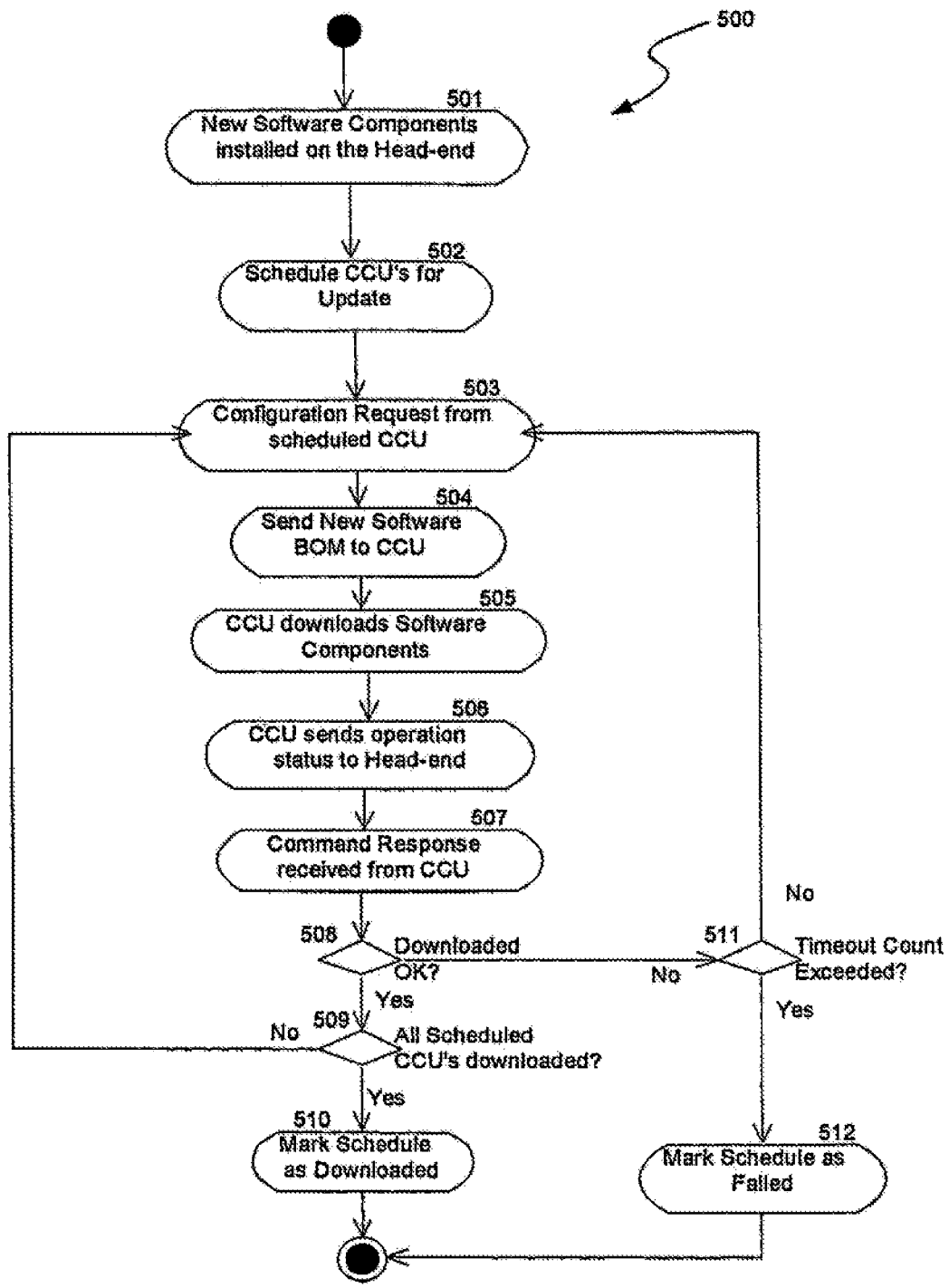
FIG. 5 is a flow chart showing an example of a system-level software download process in the software-download facility of FIG. 2.

Referring to FIG. 5, a software download process 500 permits a CCU to download software from a head-end system. A software download process running at the CCU, such as the software download process component 212 of FIG. 2, is responsible for initiating communications with the head-end.

At block 501 new software components are installed at the head-end. At block 502 an administrator schedules a CCU to download a software update. At block 503 the scheduled CCU sends out a configuration request to the head-end. This may include posting a message to a configuration request ASP page. The configuration request message may also include appended software command responses (ACKs/NAKs). At block 504 the head-end "replies to the configuration request message by sending a software configuration data back to the CCU, including software download commands and/or a new software BOM that contains all the information needed by the CCU to verify the validity of the current installed version. At block 505 the CCU downloads the software components to its file system. At block 506 the CCU sends an operation status message to the head-end. This may occur at some point during the download and may include posting a configuration response message to a configuration response ASP page. While not shown, the head-end may reply to the configuration response message via an HTTP reply.

At block 507 the head-end receives a command response message from the CCU. The command response message may indicate whether the download was successful. At decision block 508 if the download was successful the routine continues at decision block 509. However, if at block 508 the download was not successful, the process continues at decision block 511 where the head-end checks if a timeout count for the download was exceeded. If at decision block 511 the timeout count was exceeded, the process continues at block 512 where the head-end system marks the scheduled download as "failed" and then ends. Otherwise, if at decision block 511 the timeout count is not exceeded, the process loops back to block 503 and repeats the process for the same CCU.

Where a group of CCUs in involved, the routine continues at decision block 509 where the head-end checks if all scheduled CCUs in the group have completed the download. While the downloading of the CCUs in the group may be occurring in parallel, because responses from CCUs may be sent at different times, the routine repeats itself each time a new configuration response is received at the head-end. Accordingly, if at decision block 509 all scheduled CCUs have not been downloaded, the routine loops back to block 503. Otherwise, if at decision block 509 all scheduled CCUs have been downloaded, the process continues at block 510 where the head-end marks the scheduled download as "complete" for all scheduled CCUs in the group. The process then ends.

Figure 6:
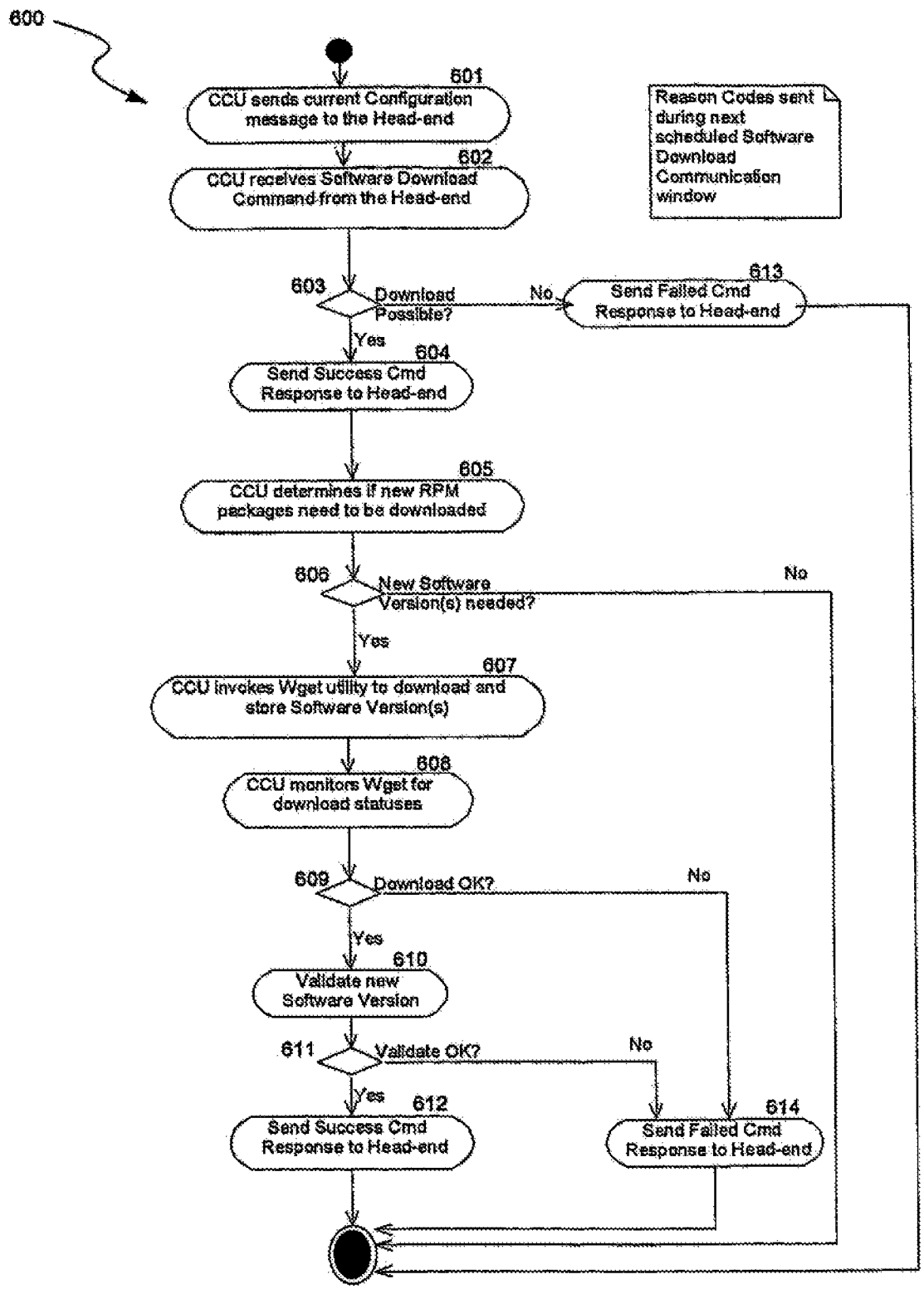
FIG. 6 is a flow chart showing an example of a software download routine in the CCU of FIG. 2.

FIG. 6 is a flow chart showing an example of a routine 600 that occurs at the CCU during the software download process of FIG. 5 (see i.e., block 505 of FIG. 5). At block 601 the CCU sends a configuration message to the head-end. At block 602 the routine receives a software configuration response message from the head-end, which includes any additional download commands (take-effect time, cancel, etc.). The CCU's software download process may be responsible for processing the software configuration response along with any additional software download commands received from the head-end. In decision block 603 the routine checks to see if the download is possible. If the download is not possible, the routine sends a "failed" command response message to the head-end (block 613) before ending. Otherwise, if at decision block 603 the download is possible, the routine continues at block 604 where the routine sends a "success" command response message to the head-end.

At block 605 the routine determines if new RPM packages need to be downloaded. In decision block 606 if new software versions are needed, the routine continues at block 607. Otherwise, the routine ends. At block 607 the routine invokes the Wget utility to download and store the appropriate software versions. At block 608 the routine monitors Wget for download statuses (complete, failed, etc.). In decision block 609 if the download is unsuccessful, the routine continues at block 614 where the routine sends a "failed" command response to the head-end before ending. Otherwise, at decision block 609 if the download is successful, the routine continues at block 610 where the new version of the software is validated. In decision block 611 if the validation is not successful, the routine continues at block 614 where the routine sends a "failed" command response to the head-end before ending. Otherwise, if at decision block 611 the validation is successful, the routine continues at block 612 where the routine sends a "success" command response message to the head-end before ending.

Figure 7:
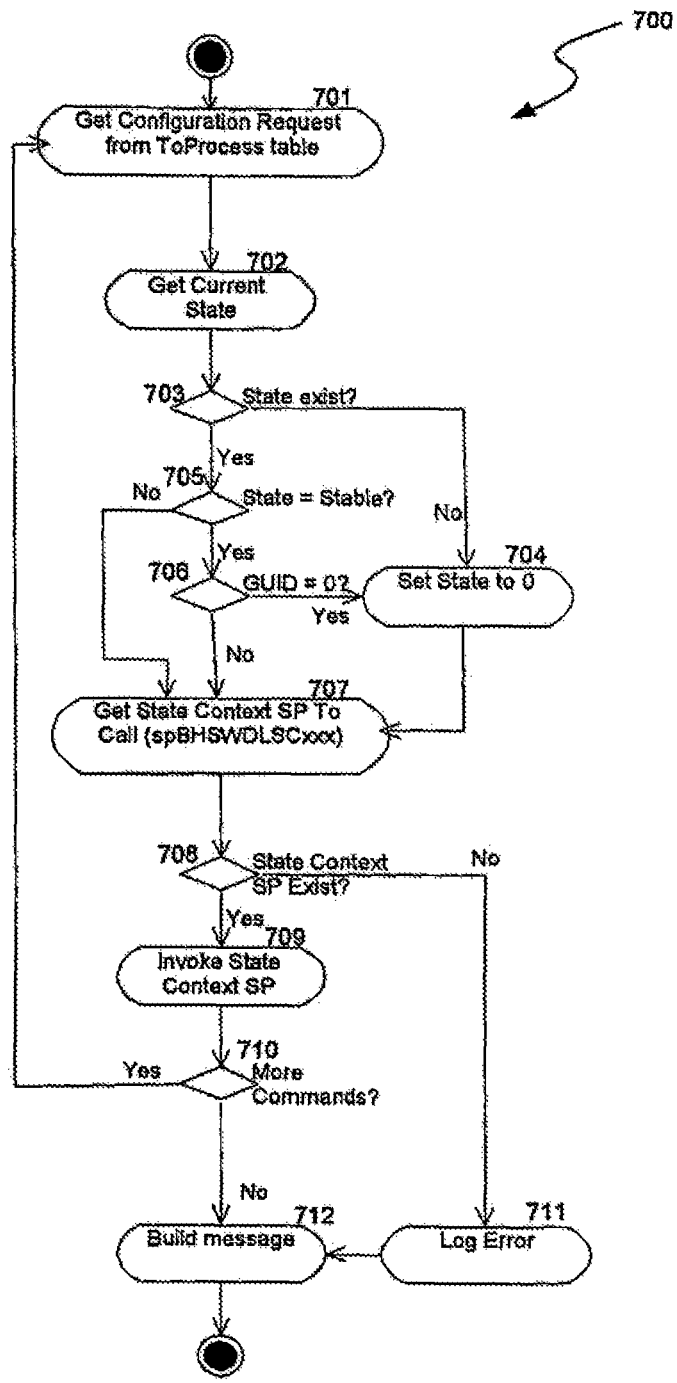
FIG. 7 is flow chart illustrating an example of a software download routine in the head-end of FIG. 2.

Referring to FIG. 7, a software download routine 700 is called by an ASP component, such as the ASP component 222 of FIG. 2, after the configuration request message has been received, parsed and stored in a "To Process" table at the head-end database. The routine invokes the head-end state machine for state determinations.

At block 701 the routine retrieves a configuration request message from the ToProcess table. At block 702 the routine gets the current state via the state machine. The state machine achieves this by querying one or more head-end database tables for software configuration data. The state machine then forwards this information along with any required software download command messages back to the ASP component. In decision block 703 if a state does not exist, the state is set to zero by default (block 704) before continuing at block 707. Otherwise, if a state does exist at block 703 the routine proceeds to decision block 705 where the routine checks to see if the state is stable. If the state is not stable, the routine proceeds to block 707. Otherwise, if at decision block 705 the state is stable, the routine continues at block 706 where the routine checks to see if the globally unique identifier (GUID) of the configuration request is equal to zero.

If the GUID of the configuration request is equal to zero, the state is also set to zero at block 704. Otherwise, if at decision block 706 the GUID is not equal to zero, the routine continues at block 707. At block 707 the routine gets the next state context stored procedure to be called. At block 708 if the state context stored procedure does not exist, the routine logs an error (block 711) and builds a corresponding message (block 712) before ending. Otherwise, if at decision block 708, the state stored procedure exists, the routine continues at block 709, where the routine invokes the state context stored procedure. At decision block 710 if additional configuration request commands are waiting in the ToProcess table, the routine loops back to block 701. Otherwise, the routine builds the appropriate log message (block 712) and then ends.

Once downloaded onto a CCU, software is typically stored on the CCU as a "next" software version. To allow for flexibility as to when the software version will in take effect, the downloaded software will usually not take effect on the CCU until a scheduled take effect time is established for the CCU. Once a CCU is scheduled with a take effect time, it is then responsible for knowing its own take effect time and installing or loading downloaded software versions accordingly.

Figure 8:
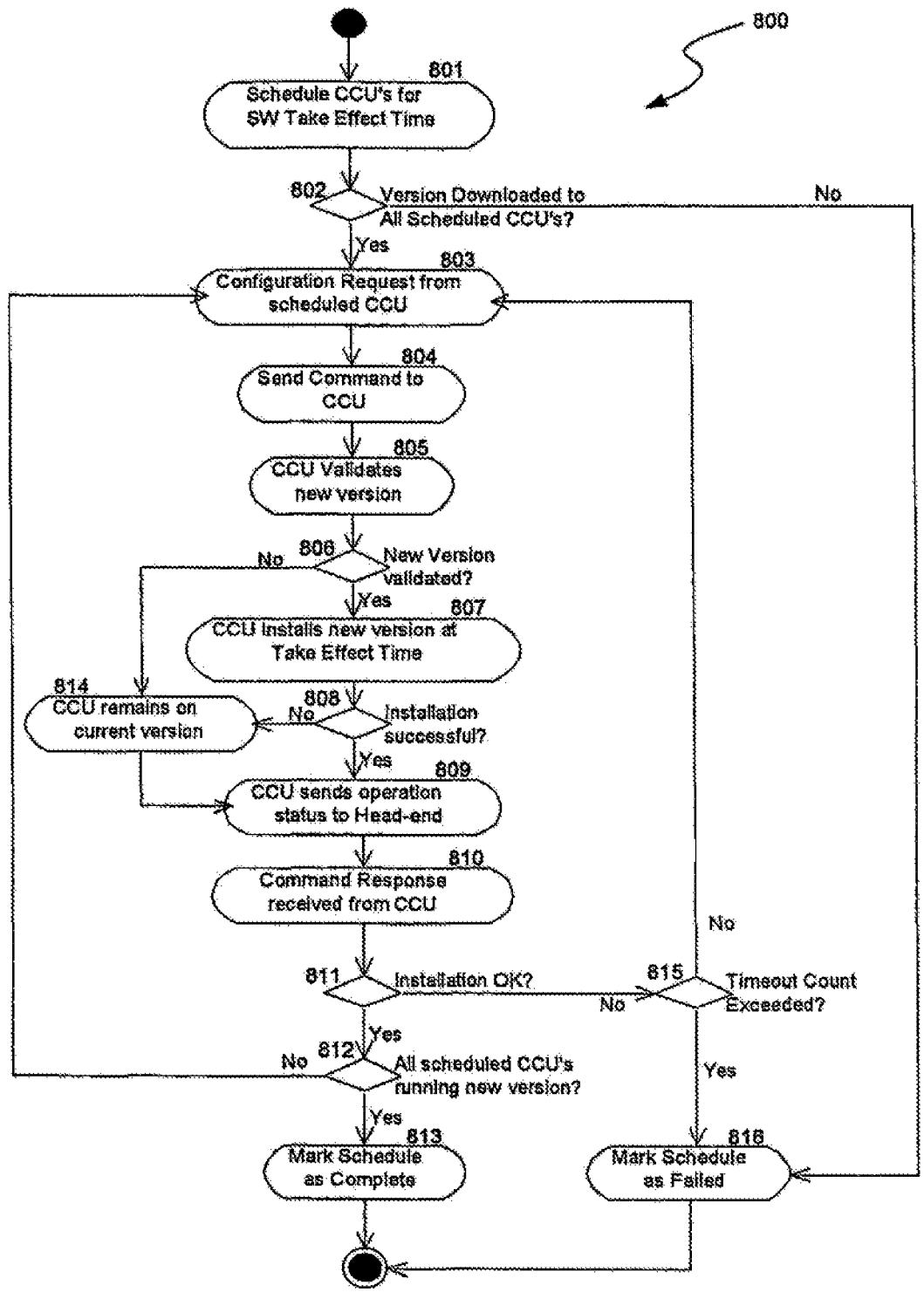
FIG. 8 is an example of a system-level software take effect process in the software-download facility of FIG. 2.

Referring to FIG. 8, a take effect process 800 involves creating a schedule with a take effect time for one or more CCUs. The take effect process 800 begins at block 801 where an administrative user invokes a stored procedure that provides the interface needed to set a take effect time for the desired CCUs next software version. During the invocation of the stored procedure, if the CCU is in the downloaded state, the CCU may be set to the take effect pending state so that a take effect command will be sent to the CCU the next time the CCU communicates with the head-end. If the CCU is in a download pending, download in transit, or download accepted state, the take effect time may be saved and the head-end may send the take effect command to the CCU upon notification that the software download operation has successfully completed.

At decision block 802 the process checks to see if the software version is downloaded to each of the scheduled CCUs. If the scheduled version is not currently downloaded on each of the scheduled CCUs, the process proceeds to block 816 where the schedule request is marked "failed" before ending. If at block 802 the scheduled version is downloaded to each of the scheduled CCUs, the process continues at block 803 where the head-end receives a configuration request from the next scheduled CCU (assuming the take effect time is still in the future). In response to receiving the configuration request, the head-end sends a command to the CCU to proceed with the take effect (block 804). At block 805 the CCU validates the new version of the software. At decision block 806 if the validation fails, then the CCU remains on the current version of the software (block 814) and the process proceeds to block 809. If, however, at decision block 806 the CCU properly validates the new version, the process continues at block 807 where the CCU installs the new version of the software at the scheduled take effect time. At decision block 808 a check is made to determine if the installation was successful. If, at block 808 the installation was not successful, the CCU remains on the current version of the software (block 814) and the process continues at block 809. Otherwise, if at block 808 the installation was successful, the process continues at block 809 where the CCU sends an operation status message to the head-end system.

At block 810 the head-end receives a command response message from the CCU. If, at decision block 811 the command response message indicates that the installation was not successful, the process proceeds to block 815, where if a timeout count is exceeded the process proceeds to mark schedule as failed before ending. Otherwise, if at decision block 815 the timeout count is not exceeded, the process loops back to block 803. If at decision block 811 the installation is okay, the process continues at decision block 812 where the head-end checks to see if all scheduled CCUs are running on the new version. If not, the process loops back to block 803, after receiving a configuration request from the another scheduled CCU. If at decision block 812 all scheduled CCUs are running the new version, the process continues at block 813 where the schedule is marked as complete. The process then ends.

When take effect functionality is applied to a group of CCUs, a validation to check on the group's status (to ensure consistency within the group) may be performed first. If the validation fails and an override flag is set, the administrator may then invoke the take effect operation for each CCU in the group after logging an error. In some embodiments, the group take effect functionality may allow for "incremental", addition of CCUs to the group, as well as allowing for updates to the take effect time of state-checked CCUs that have not yet taken effect. Incremental application of take effect time is possible since the take effect operation checks to see what the state of a CCU is prior to establishing a new take effect time. If the CCU state is not "Download Pending," Download In Transit," "Download Accepted," or "Downloaded," the function will fail, indicating to the user that the state was invalid for the operation.

Figure 9:
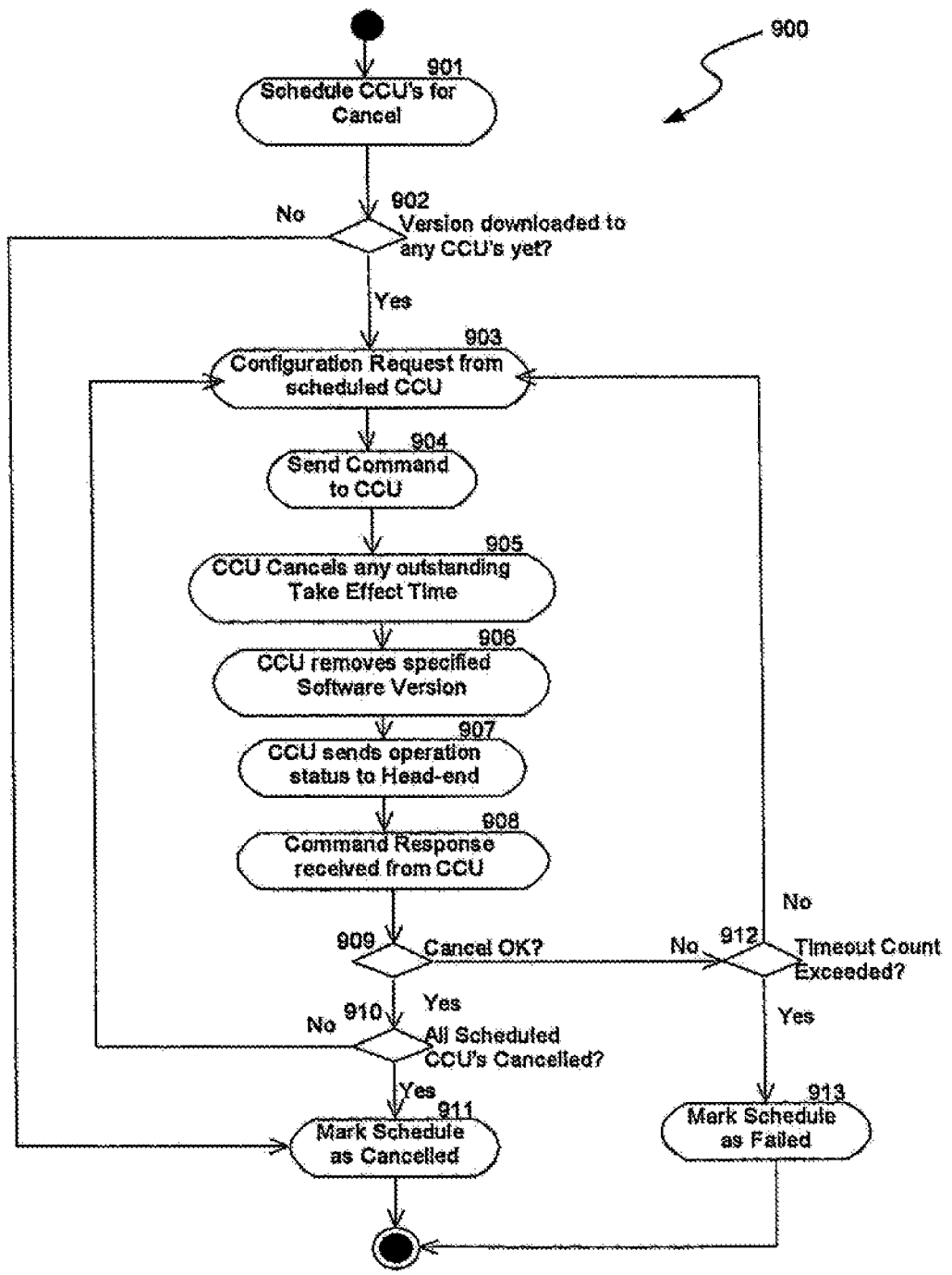
FIG. 9 is an example of a system-level software cancel process in the software-download facility of FIG. 2.

Referring to FIG. 9, a system-level process 900 is shown for canceling a software download request that has been downloaded to the CCU but not yet installed. At block 901, an administrative user that wishes to cancel an upcoming software change invokes a stored procedure that schedules the CCU to enter into a "cancel pending" state so that a cancel command will be sent to the CCU the next time the CCU communicates with the head-end. If the CCU is in the "Download Pending" or "Rollback Pending" state, it will be set back to the "Stable" state and no command will be sent to the CCU. If the CCU is in the "download accepted," downloaded," "take effect pending," or take effect accepted" states, the cancel command may be sent to the CCU. If, during the course of the cancel operation, the head-end determines that the CCU has already completed the installation of the new software version, an error message may be logged and the CCU's state may be updated to show the "current" CCU software version.

In decision block 902 if the version has not been downloaded to any CCUs yet, then the process continues at block 911 where the cancel schedule is marked as cancelled. Otherwise, if at decision block 902 the version has been downloaded to the CCUs, then the process continues at block 903 where the head-end receives a configuration request from a scheduled CCU. At block 904 the head-end process responds by sending a cancel command to the CCU. At block 905 the CCU cancels any outstanding take effect time •values. At block 906 the CCU removes the cancelled software version. At block 907 the CCU sends an operation status message to the head-end. At block 908 the head-end receives a command response• from the CCU. At decision block 909 if the cancel was not okay, the process continues at decision block 912 where if a timeout count was not exceeded, the process loops back to block 903. Otherwise, if the timeout count was exceeded, the cancel schedule is marked as failed (block 913) and the process ends. If at decision block 909 the cancel was okay, the process continues at decision block 910 where if all scheduled CCUs have not been cancelled, the process loops back to block 903 for the next CCU on the cancel schedule. Otherwise, if at decision block 910 all scheduled CCUs have been cancelled, the process continues at block 911 where the schedule is marked as successfully cancelled. The process then ends.

Similar functionality may be applied to a group of CCUs. For example, when a cancel command is applied to a group, there will probably be CCUs in various stages of download. Consequently, downstream processing of the cancel request will vary from CCU to CCU. Thus, the cancel function for groups may validate and report on the consistency of the group prior to issuing the Cancel request. If validation fails and an override flag is set, a cancel operation may be performed on each CCU in the group after logging an error. A stored procedure may loop through the set of CCUs as defined by a group ID and invoke a request cancel stored procedure for each CCU in the group.

To have a CCU rollback to a previous software version that has been stored on the CCU, but not in current use, the CCU's state can be updated into a "Rollback Pending" state so that a rollback command will be sent to the CCU the next time the CCU communicates with the head-end.

Figure 10:
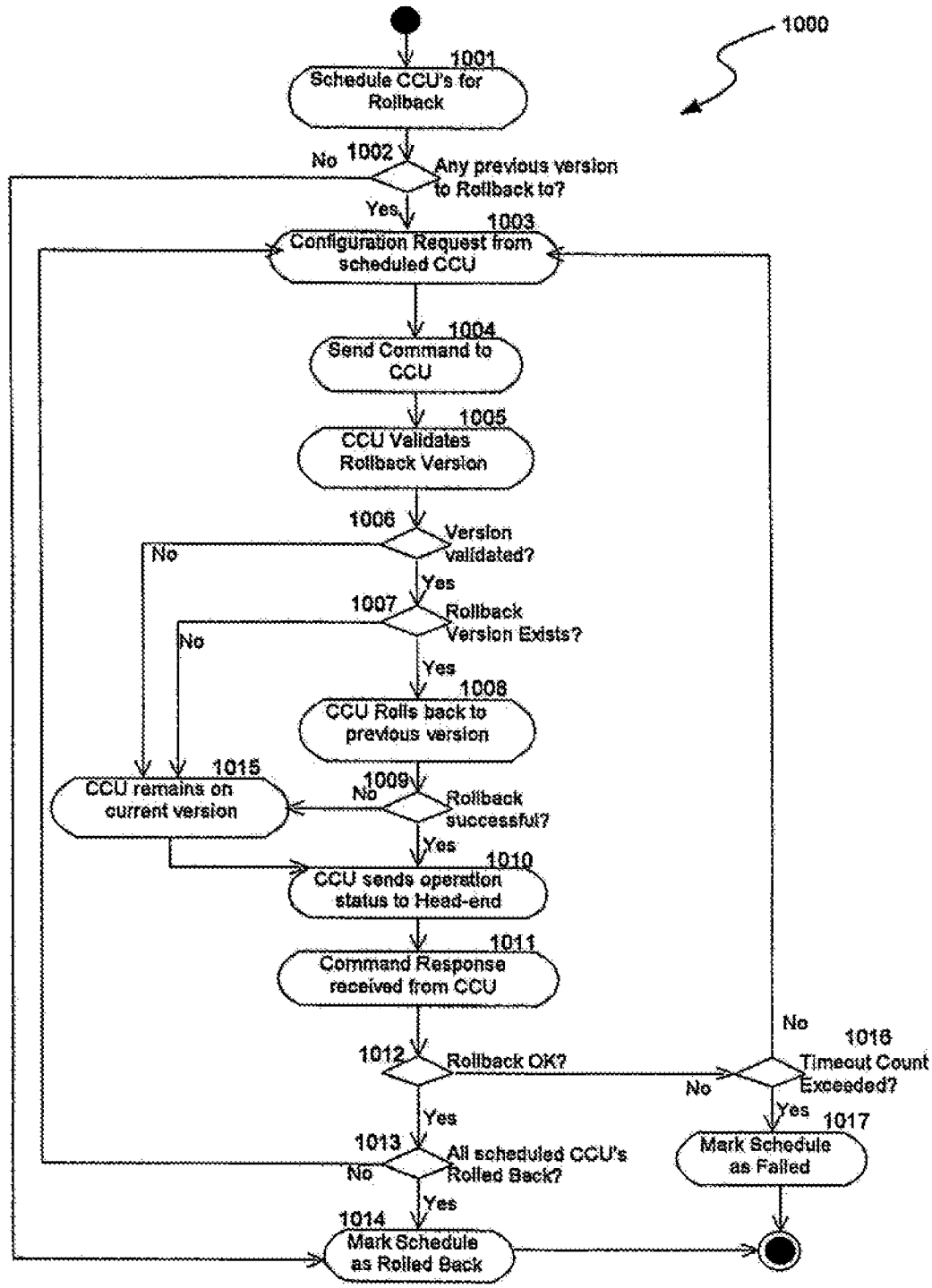
FIG. 10 is an example of a system-level software rollback process in the software-download facility of FIG. 2.

Referring to FIG. 10, a process 1000 for conducting software rollbacks in one embodiment whereby a CCU may reinstall a previously installed version of software saved on that CCU. Allowing CCUs to return to a previous version can be useful in circumstances where current versions are not running properly, or in a variety of other circumstances. At block 1001 an administrator schedules one or more CCUs for rollback to a previous software version at a specific time and date. Because the rollback command may only be valid in certain CCU states, such as the "stable" and "rejected" states, the stored procedure providing the interface for scheduling rollbacks may be configured to validate and report on the state of subject CCUs prior to issuing the rollback request.

At decision block 1002 if there is no previous version to roll back to, the rollback schedule is marked as completed. If, however, at decision block 1002 there is a previous version stored at the CCU to rollback to, at rollback time the process continues at block 1003 where the head-end receives a configuration request from the scheduled CCU. At block 1004 the head-end sends a rollback command to the CCU. At block 1005, the CCU validates the rollback version. At decision block 1006 if the version is successfully validated, the process continues at block 1007. Otherwise, the process continues at block 1015 where the CCU remains on the current version and sends an operation status request to the head-end (block 1010).

At decision block 1007 if the scheduled rollback version exists on the CCU, the process continues at block 1008. Otherwise, the process proceeds to block 1015 where the CCU remains on the current version, and then skips to block 1010 to send an operation status message to the head-end. At block 1008 the CCU rolls back to the previous version of the software. At decision block 1009, if the rollback occurs successfully, the process continues at block 1010. Otherwise, the process advances to block 1015 where the CCU remains running on the current version then skips to block 1010 to send an operation status message to the head-end.

At block 1010 the CCU sends an operation status message to the head-end. At block 1011 the software-download process receives a command response message from the CCU. At decision block 1012 if the rollback is successful, the process continues at decision block 1013. Otherwise, if at decision block 1012 the rollback is not successful, the process proceeds to decision block 1016 where the process checks to see if the timeout count is exceeded. If at block 1016 the timeout count is exceeded, the process continues block 1017 where the schedule is marked as having a failed rollback before the process ends. If the timeout count is not exceeded, the process loops back to block 1003 where the process receives a configuration request from the CCU.

At decision block 1013 if all scheduled CCUs have been rolled back then the process continues at block 1014. Otherwise, the process loops back to block 1003 where the process receives a configuration request from another scheduled CCU. At block 1014 the process marks the scheduled CCU as rolled back.

When a rollback command is applied to a group of CCUs there may be CCUs in various stages of download. Consequently, downstream processing of the rollback command will vary from CCU to CCU.

Figure 11:
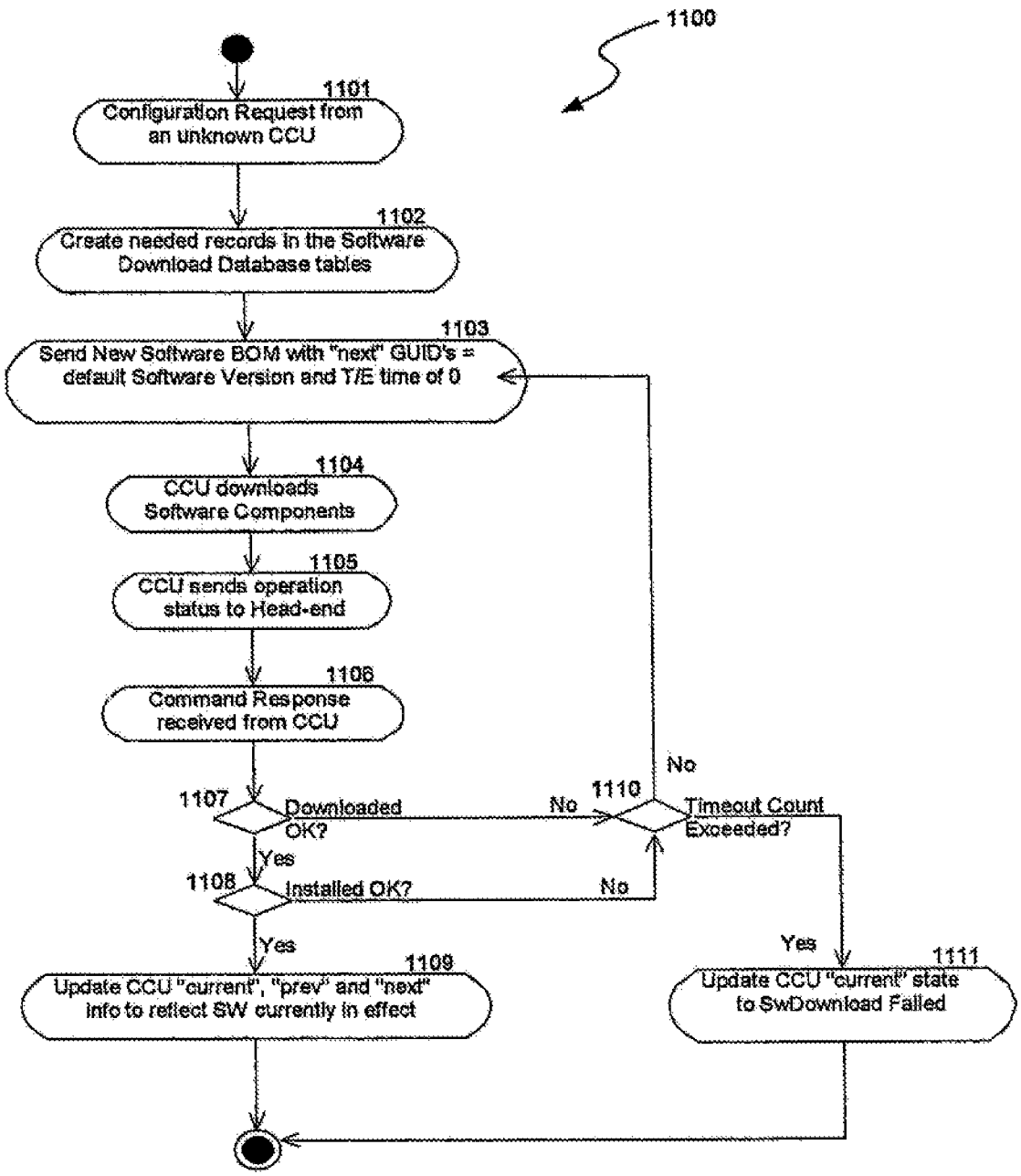
FIG. 11 is an example of a CCU discovery process in the software download facility of FIG. 2.

The system may also provide a process for "discovering" a CCU that has been newly added to the network, or a CCU that is returning the network after being disabled for some period of time. FIG. 11 is a flow chart showing an example of a process 1100 for discovering a CCU that is not recognized by the network in one embodiment. At block 1101 the head-end receives a configuration request from a CCU that is not known on the network. At block 1102 appropriate records are created in the software download database tables. At block 1103 a new software BOM is sent to the CCU with a next version set to the default software version. This next version is given the take effect time of 0, so that the default version is scheduled to take effect upon download. At block 1104 the CCU downloads the software components from the head-end. At block 1105 the CCU sends an operation status message to the head-end indicating that the download has taken place. At block 1106 the software download process receives a command response message from the CCU.

At decision block 1107 if the download was successful, the process continues at block 1108. Otherwise, the process continues at block 1110 where if the timeout count is not exceeded, the process loops back to block 1103. If at decision block 1110 the timeout count was exceeded, the process continues at block 1111 where the CCUs current state is updated to download failed, after which the process ends. If at decision block 1,110 the timeout count was not exceeded, the process loops back to block 1103, where the new software BOM is resent to the CCU. At decision block 1108 if the installation of the software was okay, the process continues at block 1109. If, however, at decision block 1108 the install was not successful, the process continues at decision block 1110 for a check of the timeout count. If the timeout count was not exceeded, the process loops back to block 1103 where a new software BOM is sent. At block 1109 the CCU's current, previous and next information is updated to reflect the software version that is currently in effect. The process then ends.

V. Grouping CCUs

As described, most of the software download facility's functionality can be applied either to single CCUs or groups of CCUs. A group of CCUs is an association of one or more CCUs that can be acted upon in a consistent manner. For example the operator could set up a group of CCUs to be used to test new software versions and later assign the new software version to this group as a whole instead of having to manage them separately.

Through the use of CCU groups, a software version may be targeted for an individual CCU, a group of CCUs or all CCUs within a system. For example, Software Version 123' could be fully implemented on CCUs in group A, fully downloaded but not implemented on CCUs in group B, partially downloaded to CCUs in group C, partially implemented on CCUs in group D and never scheduled to be implemented on CCUs in group E.

Reporting functions may be used to evaluate the current state •of a group and of a software version so that the appropriate updates can be made. While the system may not generally assign CCU states on the basis of software version, the status of a software version at any CCU can be determined through database queries. In some embodiments, the database queries can roll-up the individual CCU states and present the information in a manner that will allow the user to determine the software version state of the system. Using these and similar reporting functions, information about CCUs and groups of CCUs can be determined such as whether members of the group have the same next version and what CCUs are out of sync with a group's definition. In addition, reporting functionality may be able to help determine the state of a specified software version (e.g., which CCUs are running it, which CCUs have successfully downloaded the version, etc.).

For example, in response to a user query: 'What is the current status of CCU group 123?," a reporting function may provide as follows: "Four CCUs from the group have successfully downloaded the requested version; two are still in the process of downloading the requested version; and one has failed." Likewise, in response to a user query: 'What is the current status of SW version XYZ?," a reporting function may provide as follows: "Version x:fZ has been assigned to CCU group 1 (CCUs a, b, and c) but not yet scheduled to be downloaded;" or "Version XYZ has been assigned to CCU group 2 (CCUs d, e, and f), downloaded to d, in the process of being downloaded to e, and failed downloaded to f;" or "Version XYZ has had a take effect time scheduled for CCU Group 3 (CCUs g, h, and i) for Oct. 11, 2003, the take effect time sent to g, in the process of being sent to h, and failed when sent to i;" or "Version x:fZ has had a take effect time scheduled for Group 4 (collectors j, k, and l) for Sep. 11, 2003, the SW was installed successfully in j and k, but failed in I;"

or "Version XYZ is currently running in collector m because m failed the update to version+1 and rolled back."

Once generated, such queries can run periodically, before scheduled events (e.g., prior to a take-effect event), or at the request of a user. The outcome of the reporting functions may be• reports that may be of use in a variety of applications. The reporting functions could also generate alarms/reports that would alert the administrator of problems with, for example, an update/install procedure, so such outstanding problems can be corrected. Additionally, a user interface tied to the reporting functions may provide, for example, a graphical or textual composite view of the state or status of groups of CCUs. For example, a graphical pie chart may display a percentage of CCUs in a download pending state and a percentage of CCUs in a download failed state. In another example, states of CCUs within a group may be presented in a bar chart with various colors used to represent different subgroups within the group, or even individual CCUs in the group. For example, the color green may represent all CCUs in a desired state, such as the stable state, the color yellow may represent all CCUs in a transitional state, such as the download pending state, and the color red may represent all CCUs in a problematic state, such as the download failed state. Likewise, special graphical, textual, or even audio indicators (e.g., highlighted text, flashing displays, alarm sounds, etc.) may be used to flag problems, such as CCUs from the group in a failed state. Many other representations of the reporting functions are possible without departing from the scope of the invention.

Figure 12:
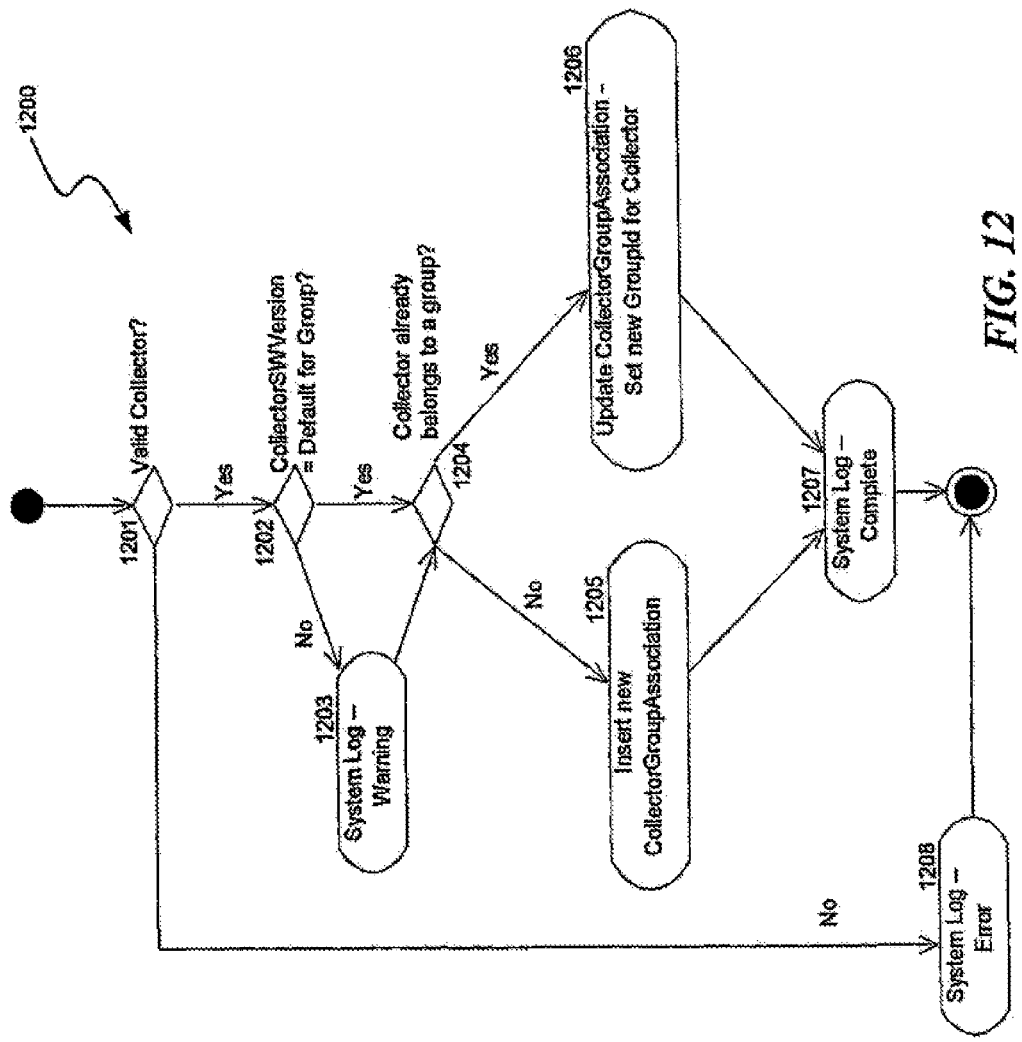
FIG. 12 is an example of a routine in the software download facility of FIG. 2 for adding a CCU to a group of CCUs.

Because grouping CCUs may be useful, the system may provide procedures for controlling the grouping of CCUs. For example, administrative users may be able to add/remove CCUs from a group. FIG. 12 is a flow chart showing an example of a routine 1200 for adding a CCU to a group of CCUs. The routine begins at decision block 1201 where if the CCU identified for addition to the group is a valid CCU, the routine continues at decision block 1202. If the new CCU is not valid, an error is logged (block 1208). At decision block 1202 the routine checks to see if the new CCU's current version is compatible with the group's default version. If not, the system logs a warning at block 1203. At this point, the operation may still be allowed and reporting functions may determine what CCUs are out of sync with the group definition. If at block 1202 the CCU's current version is compatible with the group's, the routine continues at decision block 1204 to determine whether the new CCU is currently a member of another group. If the new CCU is not a member of another group, the routine continues at block 1205 where the routine inserts a new collector' group association record for the new CCU into a database table. If, however; at decision block 1204 the collector already belongs to a group, the routine continues at block 1206 where the routine updates the CCUs current collector group association to include the desired group or groups. After either block 1205 or block 1206, the routine continues at block 1207, where a log is created indicating that the addition of the CCU is complete. The routine then ends.

A similar routine (not shown) may be implemented for removing a CCU from a group. In some embodiments, if the CCU is not subsequently assigned to a new group after being removed it may become part of a default group.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the automatic meter-reading system described herein. The elements and acts of the various embodiments described above can be combined to provide further embodiments and some steps may be deleted, moved, added, subdivided, combined, and/or modified. Each of these steps may be implemented in a variety of different ways. Also, while these steps are shown as being performed in series, these steps may instead be performed in parallel, or may be performed at different times.

While the term "field" and "record" are used herein, any type of data structure can be employed. For example, relevant data can have preceding headers, or other overhead data proceeding (or following) the relevant data. Alternatively, relevant data can avoid the use of any overhead data, such as headers, and simply be recognized by a certain byte or series of bytes within a serial data stream. Any number of data structures and types can be employed herein. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words in the above detailed description using the singular or plural number may also include the plural or singular number respectively. Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The teachings of the invention provided herein can be applied to other systems, not necessarily the system described herein. These and other changes can be made to the invention in light of the detailed description. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above detailed description. While the above description details certain embodiments of the invention and describes the best mode contemplated, no matter how detailed the above appears in text, the invention can be practiced in many ways. Details of the protocol, data model, and processing scheme may vary considerably in its implementation details, while still being encompassed by the invention disclosed herein. As noted above, particular terminology used when describing certain features, or aspects of the invention should not be taken to imply that the terminology is being re-defined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What is claimed is:

1. A method of managing software in a data collection device via a head-end server, the method comprising:
in response to receiving a software update, determining if the data collection device is to receive the software update;
if the data collection device is to receive the software update, setting, in memory, a state indicator for the data collection device to an update state;
in response to receiving a configuration request from the data collection device when the corresponding state indicator is set to the update state, sending an update command to the data collection device, the update command to include a bill of materials corresponding to the software update and a time for the software update to take effect; and
in response to receiving a first command to cancel the software update:
if the first command is received before the time for the software update is to take effect, setting the state indicator to a cancel state, and
if the first command is received after the time for the software update is to take effect, setting the state indicator to a rollback state.

2. A method as defined in claim 1, further comprising:
managing, in memory, the state indicator for the data collection device; and
in response to receiving meter consumption data from the data collection device, sending a second command to instruct the data collection device to enter the a state indicated by the state indicator for the data collection device, the second command to cause the data collection device to execute routines associated with the state.

3. A method as defined in claim 2, wherein the second command instructing the data collection device to enter the update state causes the data collection device to send the configuration request to the head-end server.

4. A method as defined in claim 1, in response to receiving a configuration request from the data collection device when the corresponding state indicator is set to the rollback state, sending a rollback command to data collection device, the rollback command to cause the data collection device to revert to a previous version of software before the software update.

5. A method as defined in claim 4, in response to receiving a communication from data collection device indicating that the data collection device successfully reverted to the previous version of the software, setting the state indicator to a stable state.

6. A method as defined in claim 1, in response to receiving a configuration request from the data collection device when the corresponding state indicator is set to the cancel state, sending a cancel command to data collection device, the cancel command to instruct the data collect device to cancel the time for the software update is to take effect.

7. A method as defined in claim 6, in response to receiving a communication from data collection device indicating that the data collection device successfully cancelled the time for the software update is to take effect, setting the state indicator to a stable state.

8. A head-end server for managing software a data collection device, comprising:
a processor to, in response to receiving a software update, determine if the data collection device is to receive the software update;
a state machine to:
if the data collection device is to receive the software update, set a state indicator for the data collection device to an update state;
in response to receiving a first command to cancel the software update:
if the first command is received before the time for the software update is to take effect, set the state indicator to a cancel state, and
if the first command is received after the time for the software update is to take effect, set the state indicator to a rollback state; and
a network interface to, in response to receiving a configuration request from the data collection device when the corresponding state indicator is set to the update state, send an update command to the data collection device, the update command to include a bill of materials corresponding to the software update and a time for the software update to take effect.

9. A head-end server as defined in claim 8, wherein:
the state machine is further to manage the state indicator for the data collection device; and
the network interface is further to, in response to receiving meter consumption data from the data collection device, send a second command to instruct the data collection device to enter the a state indicated by the state indicator for the data collection device, the second command to cause the data collection device to execute routines associated with the state.

10. A head-end server as defined in claim 9, wherein the second command instructing the data collection device to enter the update state causes the data collection device to send the configuration request to the head-end server.

11. A head-end server as defined in claim 8, wherein, in response to receiving a configuration request from the data collection device when the corresponding state indicator is set to the rollback state, the network interface is to send a rollback command to data collection device, the rollback command to cause the data collection device to revert to a previous version of software before the software update.

12. A head-end server as defined in claim 11, wherein, in response to receiving a communication from data collection device indicating that the data collection device successfully reverted to the previous version of the software, the state machine is to set the state indicator to a stable state.

13. A head-end server as defined in claim 8, wherein, in response to receiving a configuration request from the data collection device when the corresponding state indicator is set to the cancel state, the network interface is to send a cancel command to data collection device, the cancel command to instruct the data collect device to cancel the time for the software update is to take effect.

14. A method as defined in claim 13, wherein, in response to receiving a communication from data collection device indicating that the data collection device successfully cancelled the time for the software update is to take effect, the state machine is to set the state indicator to a stable state.

15. A system of managing software in a data collection device via a head-end server, the system comprising:
- a processor; and
- memory including instructions that, when executed, cause the processor to:
  - in response to receiving a software update, determine if the data collection device is to receive the software update;
  - if the data collection device is to receive the software update, set a state indicator for the data collection device to an update state;
  - in response to receiving a configuration request from the data collection device when the corresponding state indicator is set to the update state, send an update command to the data collection device, the update command to include a bill of materials corresponding to the software update and a time for the software update to take effect; and
  - in response to receiving a first command to cancel the software update:
    - if the first command is received before the time for the software update is to take effect, set the state indicator to a cancel state, and
    - if the first command is received after the time for the software update is to take effect, set the state indicator to a rollback state.

16. A system as defined in claim 15, wherein the instructions further cause the processor to:
- manage the state indicator for the data collection device; and
- in response to receiving meter consumption data from the data collection device, send a second command to instruct the data collection device to enter the a state indicated by the state indicator for the data collection device, the second command to cause the data collection device to execute routines associated with the state.

17. A system as defined in claim 16, wherein the second command instructing the data collection device to enter the update state causes the data collection device to send the configuration request to the head-end server.

18. A system as defined in claim 15, wherein the instructions further cause the processor to, in response to receiving a configuration request from the data collection device when the corresponding state indicator is set to the rollback state, send a rollback command to data collection device, the rollback command to cause the data collection device to revert to a previous version of software before the software update.

19. A system as defined in claim 18, wherein the instructions further cause the processor to, in response to receiving a communication from data collection device indicating that the data collection device successfully reverted to the previous version of the software, set the state indicator to a stable state.

20. A system as defined in claim 15, wherein the instructions further cause the machine to:
- in response to receiving a configuration request from the data collection device when the corresponding state indicator is set to the cancel state, send a cancel command to data collection device, the cancel command to instruct the data collect device to cancel the time for the software update is to take effect; and
- in response to receiving a communication from data collection device indicating that the data collection device successfully cancelled the time for the software update is to take effect, set the state indicator to a stable state.

* * * * *